United States Patent [19]
Nagase

[11] 3,944,287
[45] Mar. 16, 1976

[54] ELECTRO-PNEUMATIC BRAKE APPARATUS FOR RAILWAY VEHICLES

[75] Inventor: Minoru Nagase, Kobe, Japan

[73] Assignee: The Nippon Air Brake Company, Ltd., Kobe, Japan

[22] Filed: Apr. 7, 1975

[21] Appl. No.: 565,938

[30] Foreign Application Priority Data
Apr. 18, 1974 Japan.............. 49-43937
May 14, 1974 Japan............ 49-54690[U]

[52] U.S. Cl.............. 303/15; 200/83 R; 303/3; 303/22 R; 303/40
[51] Int. Cl.²............. B60T 13/68; B60T 15/14
[58] Field of Search........... 303/2, 3, 13, 15, 28, 29, 303/40, 22; 188/159, 152; 200/83 R, 81 R

[56] References Cited
UNITED STATES PATENTS

| | | | |
|---|---|---|---|
| 3,488,570 | 1/1970 | Vint, Jr. et al............... | 188/159 X |
| 3,730,596 | 5/1973 | Felix et al....................... | 303/13 X |
| 3,761,142 | 9/1973 | Williams et al................. | 303/40 X |
| 3,799,623 | 3/1974 | Wickham et al................ | 303/15 X |
| 3,823,984 | 7/1974 | Parfitt et al..................... | 303/15 X |

*Primary Examiner*—Trygve M. Blix
*Assistant Examiner*—Douglas C. Butler
*Attorney, Agent, or Firm*—R. W. McIntire, Jr.

[57] ABSTRACT

Electro-pneumatic brake apparatus for railway vehicles including a dynamic brake portion and a fluid pressure operable brake portion both of which are actuated by a common variable signal which produces a corresponding control pressure for effecting operation of said fluid pressure operable portion, such control pressure also being simultaneously converted to an electrical control pulse for effecting operation of the dynamic brake portion at the same time as, or at least not ahead of, the fluid pressure operable portion. The apparatus is further provided with a combined electro-pneumatic monitoring device for determining the sufficiency of the combined brake application.

8 Claims, 7 Drawing Figures

TABLE A

| CIRCUIT | OPERATOR'S CONTROLLER POSITIONS | | | | | | | |
|---|---|---|---|---|---|---|---|---|
| | OFF | 1 | 2 | 3 | 4 | 5 | 6 | 7 |
| 5 | | O | | O | | O | | O |
| 6 | | | O | O | | | O | O |
| 7 | | | | | O | O | O | O |

TABLE B

| CONTROLLER POSITION | MAGNET VALVES ENERGIZED | DIAPHRAGM CHAMBER PRESSURIZED | NET EFFECTIVE DIAPHRAGM AREA | DIAPHRAGM AREA RATIO (NET) | CONTROL PRESSURE AT 3.5 kg./cm$^2$, e.g. |
|---|---|---|---|---|---|
| 1 | 2 | 30 | 37−38 | 7−6=1 | 0.5 |
| 2 | 3 | 31 | 38−39 | 6−4=2 | 1.0 |
| 3 | 2,3 | 30,31 | 37−38+38−39 =37−39 | 7−6+6−4= 7−4=3 | 1.5 |
| 4 | 4 | 32 | 39 | 4 | 2.0 |
| 5 | 2,4 | 30,32 | 37−38+39 | 7−6+4=5 | 2.5 |
| 6 | 3,4 | 31,32 | 38−39+39=38 | 6−4+4=6 | 3.0 |
| 7 | 2,3,4 | 30,31,32 | 37−38+38 −39+39=37 | 7−6+6−4 +4=7 | 3.5 |

ELECTRO-PNEUMATIC BRAKE APPARATUS FOR RAILWAY VEHICLES

BACKGROUND OF THE INVENTION

Rapid transit or commuter type railway vehicles may be provided with either a fluid pressure operable brake system only or a combined electro-pneumatic brake system. The electro-pneumatic system may include a blending feature, that is, if the dynamic braking force diminishes or is insufficient for maintaining the braking level called for by the operator's signal, the pneumatic brake automatically blends in to supplement the dynamic brake to the extent necessary for maintaining the braking level desired. In some instances cars with both types of brake systems may be used in the same train in which event certain problems become manifest. For example, when a brake application is initiated on a train made up of cars equipped with both the combined electro-pneumatic system and the pneumatic system only, the dynamic brake, as is well known, reacts to the application signal first and, therefore, applies ahead of the pneumatic brake. The lag of the pneumatic brake application relative to the dynamic brake application presents no problem so long as all the cars in the train are equipped with similar type brake systems, that is, the electro-pneumatic system. But if the train includes some cars with the pneumatic brake system only, those cars with the electro-pneumatic systems get some braking action from the dynamic brakes thereon before any braking effect occurs on those cars equipped with pneumatic brakes only. Thus, when the pneumatic brakes do apply, such application lags the dynamic application, which occurs on certain cars only, the result being a push-pull effect on the train to thereby cause some discomfort to the passengers. In other words, at the onset of initial braking, the brake forces acting on the several cars are not compatible relative to time of application and, therefore, result in an unbalanced state.

Delay circuits have been incorporated in the signal circuits of the dynamic brake portion to attempt to delay the effectiveness of the dynamic brake until the pneumatic portion is actuated. But since the lag interval varies according to the degree of braking level signalled, it becomes inpractical to provide a lag circuit that would cover all situations.

The presently known electro-pneumatic brake system above discussed may also include monitoring means connected in parallel relation to the dynamic brake portion and the pneumatic brake portion for indicating that either the dynamic brake or the pneumatic brake, or both, are in effect. But, in that the respective braking forces of the dynamic and pneumatic brakes are recorded separately, the monitoring device does not give an indication of the total braking force of dynamic and pneumatic brakes prevailing at any given time, because they are not compared or related in the monitoring device, and, therefore, the information indicated may be inaccurate or misleading.

SUMMARY OF THE INVENTION

The object of the present invention, therefore, is to provide an electro-pneumatic brake system of the blending type including means for causing the braking effect of the pneumatic portion and of the dynamic portion to occur simultaneously so that cars so equipped may be used with cars equipped with pneumatic brakes only in the same train without producing a push-pull effect among the several cars. It is also the object of the present invention to provide the type of brake system above proposed with monitoring means capable of indicating whether the sum of the dynamic and pneumatic brake forces has attained the degree of braking level called for by the operator's signal.

Briefly, the invention comprises electro-pneumatic brake apparatus for railway vehicles of the rapid transit type including a primary relay valve device for converting an operator-initiated brake signal of a preselected degree to a corresponding first pneumatic control pressure, a dynamic brake portion including a pneumatic-electric converter device for receiving and converting said first pneumatic control pressure to a corresponding electric or dynamic brake control signal transmitted to the dynamic brake, a magnetic torque detector connected to the dynamic brake for detecting and transmitting the magnetic brake force generated by the dynamic brake to an electro-pneumatic converter for converting dynamic brake force to a corresponding second pneumatic control pressure, said first and second control pressures being transmitted to a secondary relay valve device for effecting supply of actuating pneumatic pressure to the brake cylinder at a degree determined by the differential between said first and second pneumatic control pressures.

The improved monitoring portion of the electro-pneumatic brake apparatus comprising the invention above described, comprises a fluid pressure switch interposed in an electrical circuit having a monitoring device connected therein, said switch device being operable responsively to the actuating pressure supplied to the brake cylinder and to said second pneumatic control pressure (corresponding to the dynamic brake force), accumulatively, to a closed position in which the monitoring device is actuated to reflect the existence of a sufficient brake application.

DESCRIPTION AND OPERATION

Figure 1:
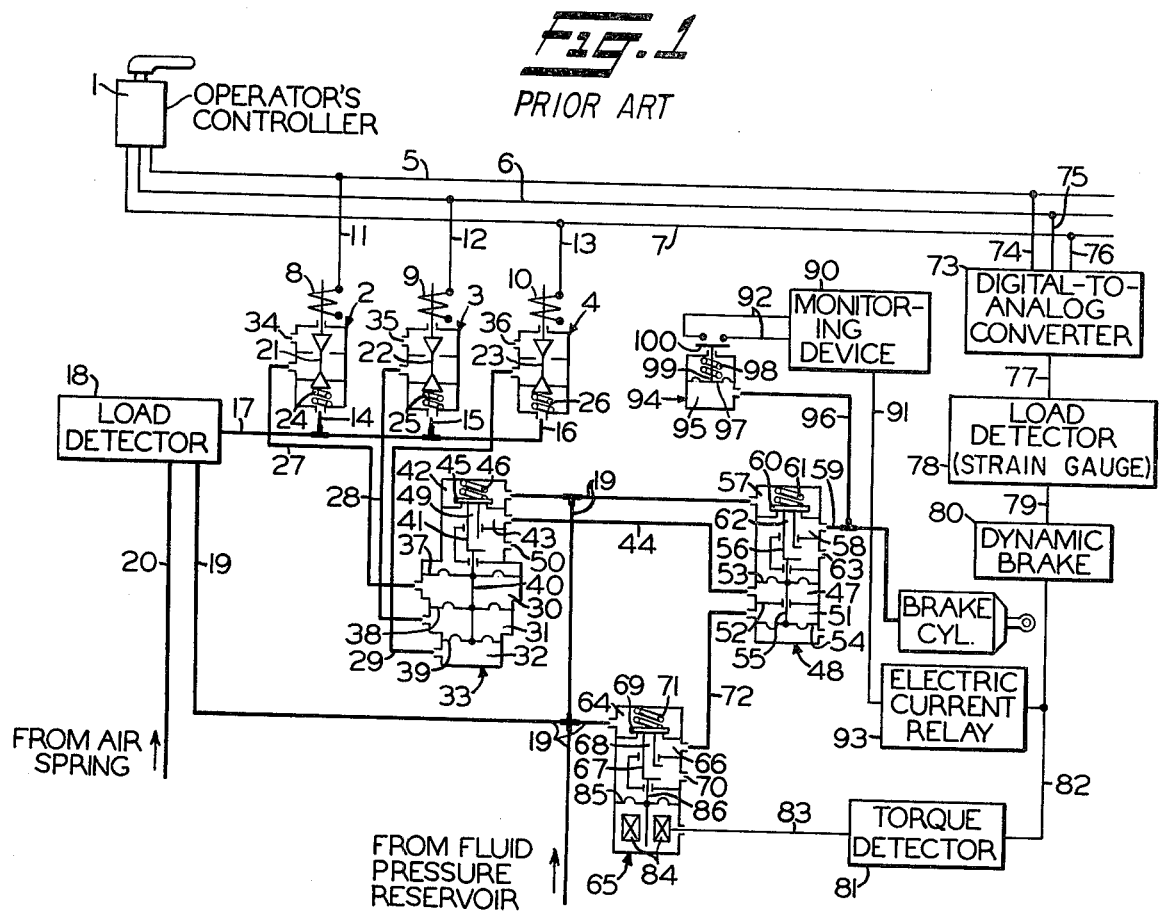
FIG. 1 is a schematic view of presently used electro-pneumatic brake apparatus.

FIG. 1 of the drawings represents a conventional electro-pneumatic brake apparatus comprising an operator's controller 1 selectively operable to a plurality of positions for selecting the degree of brake application desired. Controller 1, which produces a digital type signal, may be a binary coded controller programmed to provide the desired number of control positions which will provide the range of braking action considered adequate for the vehicle on which it is used. Controller 1, in this case, is operable to seven positions, for example, for energizing any one or a combination of three electro-magnet supply valve devices 2, 3, and 4 through respective electrical circuits 5, 6, and 7. The table shown in FIG. 6, which will hereinafter be referred to as Table A, shows, according to the binary code, the several combinations of circuits 5, 6, and 7 (and consequently magnet valves 2, 3, and 4) energized in the several positions of controller 1.

Magnet valve devices 2, 3, and 4 are provided with electrical energizing coils 8, 9, and 10 connected by electrical conductors 11, 12, and 13 to circuits 5, 6, and 7, respectively. Magnet valve devices 2, 3, and 4 are also each connected by respective branch pipes 14, 15, and 16 to a pipe 17 which, in turn, is connected, through a load detector device 18 (designated symbolically in the drawings) to a source of fluid pressure comprising a multi-branch fluid pressure supply pipe 19 connected to a fluid pressure reservoir (not shown). Load detector 18 is a fluid pressure operable conventional type device connected by a pipe 20 to vehicle air springs (not shown) and operable in well known manner for permitting flow of fluid pressure from pipe 19 to pipe 17 at a degree corresponding to the vehicle load as reflected by the pressure in the air springs.

Magnet valve devices 2, 3, and 4 also comprise poppet type valve members 21, 22, and 23, biased by springs 24, 25, and 26, when coils 8, 9, and 10, respectively, are deenergized, to respective exhaust positions, in which they are shown. When coils 8, 9, and 10 are selectively energized by operation of controller 1, the respective valve members 21, 22, and 23 are operated to respective supply positions in which pipe 17 is selectively communicated with pipes 27, 28, and 29, which, in turn, are connected to diaphragm chambers 30, 31, and 32 of a primary relay valve device 33. With valve members in their respective exhaust positions, communication between pipe 17 and pipes 27, 28, and 29 is cut off, and chambers 30, 31, and 32 are vented to atmosphere via said pipes 27, 28, and 29 through exhaust ports 34, 35, and 36 in magnet valve devices 2, 3, and 4, respectively.

Primary relay valve device 33 comprises a plurality of stacked diaphragms 37, 38, 39 connected for uniform movement with each other through a common piston rod 40 having a hollow valve seat portion 41, said relay valve device further having therein a supply chamber 42, connected to pipe 19, and a delivery chamber 43, connected to a pipe 44. For purposes of hereinafter explaining the operation of the apparatus herein disclosed, the respective effective areas of diaphragms 37, 38, and 39 may be assumed to be of the ratio of 7:6:4, for example.

Communication between pipes 19 and 44 is controlled by a valve element 45 normally biased by a spring 46 to a closed or seated position on valve seat portion 41 in which said communication is cut off, and being operable by upward movement of piston 41, in a manner to be hereinafter disclosed, to an open or unseated position relative to said valve seat portion in which said communication is effected for providing supply of fluid pressure from pipe 19, via delivery chamber 43 and pipe 44, to a first control chamber 47 of a secondary relay valve device 48. Sufficient downward movement of valve seat portion 41, so as to move out of contact with valve element 45, opens delivery chamber 43, pipe 44, and first control chamber 47 of secondary relay valve 48 to atmosphere via a vent passage 49, formed coaxially in valve seat portion 41 of piston rod 40, and a vent port 50 in primary relay valve device 33. When all forces acting on the several diaphragms 37, 38, and 39 of primary relay valve device 33 are balanced, valve seat portion 41 and valve element 45, in well known manner, assume a lap position relative to each other, said relay valve device being operative to maintain the established pressure in delivery chamber 43 and, therefore, in first control chamber 47 of secondary relay valve 48.

Secondary relay valve device 48 is provided with a second control chamber 51 isolated from first control chamber 47 by a separating wall 52. A diaphragm member 53 is operably disposed adjacent first control chamber 47, while a diaphragm member 54 is disposed adjacent second control chamber 51 in opposing relation to diaphragm member 53. Diaphragm members 53 and 54 are rigidly connected to each other by a piston rod 55 having a hollow valve seat portion 56.

Secondary relay valve device 48 is also provided with a supply chamber 57 connected to supply pipe 19, a delivery chamber 58 connected to a brake cylinder pipe 59 leading to a brake cylinder indicated BRAKE CYL. in the drawing, a valve element 60 cooperating with valve seat portion 56 for controlling communication between said supply chamber and said delivery chamber, and a spring 61 for urging said valve element toward a closed or seated position on said valve seat portion in which said communication is cut off. Valve seat portion 56 of piston 55 also has a central exhaust passage 62 via which brake pipe 59 and, therefore, the brake cylinder may be vented to atmosphere by way of a vent port 63 when valve element 60 is operated to an open or unseated position relative to valve element 60 in a manner to be hereinafter set forth.

Valve seat portion 56 of piston rod 55, valve member 60, and spring 61 all cooperate in well known manner similar to that described above in connection with primary relay valve device 33 in providing a lapping action by supplying fluid pressure to and venting from brake cylinder pipe 59, as the situation demands, in maintaining the pressure called for in said brake cylinder pipe.

Fluid pressure supply pipe 19 is also connected to a supply chamber 64 of an electro-pneumatic converter relay valve device 65, which is also provided with a delivery chamber 66, a hollow valve seat portion 67 having a central exhaust passage 68, a valve element 69, a vent port 70, and a spring 71 all arranged and functioning similarly to the respective supply and and delivery chambers, valve seat portions, valve elements, and springs of the primary and secondary relay valve devices 33 and 48 to deliver and maintain controlled fluid pressure via a pipe 72 to second control chamber 51 of the secondary relay valve device 48.

The presently known apparatus shown in FIG. 1 also comprises a digital-to-analog converter 73, which may be of any suitable conventional type, connected by electrical conductors 74, 75, and 76 to circuit 5, 6, and 7, respectively, for converting the preselected digital signal from the engineer's controller 1 to an analog signal. The analog signal is transmitted by an electrical conductor 77 to a load detector device 78, such as a strain gauge, for example, represented symbolically, which modifies the analog signal according to the existing vehicle load before transmitting such brake actuating signal via an electrical conductor 79 to the dynamic brake represented symbolically at 80 which responds to said signal for effecting, in conventional manner, a dynamic brake application according to the magnitude of the signal.

As is well known to those skilled in the art, the dynamic brake application diminishes in effectiveness as the brake-applying power from the wheel generator diminishes due to the corresponding retardation of wheel rotation rate. It becomes necessary, therefore, to compensate for such loss in dynamic brake in increasing the effectiveness of the pneumatic braking which is initiated substantially at the same time as the dynamic braking with both blending together to provide the braking action called for, all of which will be explained henceforth. Thus, a torque or magnetic force detector device 81 is connected by an electrical output conductor 82 from dynamic brake 80 to register the magnetic torque force generated by said dynamic brake and convert such force to a corresponding electrical current which, in turn, is transmitted via an electrical conductor 83 to a solenoid 84 operably associated with the electro-pneumatic converter relay valve device 65.

Electro-pneumatic relay valve device 65 is provided with a diaphragm type piston 85 having a piston rod 86, including the valve seat portion 67, connected thereto, said diaphragm being subjectable to a downwardly directed force, as viewed in the drawing, exerted thereon by prevailing pressure in delivery chamber 66, and to an opposite upwardly directed force exerted thereon when solenoid 84 is energized.

In considering the operation of the presently known electro-pneumatic brake apparatus shown in FIG. 1, let it be assumed that the operator sets the controller 1 at position 3. According to the binary code program, which is set forth in graphic form or TABLE A in FIG. 6, circuits 5 and 6, and therefore magnet valves 2 and 3 are energized, thereby causing diaphragm chambers 30 and 31 of the primary relay valve device 33 to be charged with fluid pressure. The net effective diaphragm pressure area subjected to fluid pressure, therefore, may be expressed by the equation 37−38+38−39=37−39, which designates the diaphragms subjected to fluid pressure and the direction of the forces resulting therefrom, or a diaphragm area ratio of 3, that is, 7−4=3, according to the ratio relationship of diaphragms 37, 38, and 39 above set forth. The step-by-step operation of the pneumatic portion of the brake apparatus is set forth in TABLE B shown in FIG. 7, wherein the respective control pressure obtained for each portion of controller 1, as shown in the last column of the table headed CONTROL PRESSURE, is by way of example only.

Primary relay valve 33, therefore, operates in conventional manner to effect supply of a first control pressure to first control chamber 47 of secondary relay valve 48 according to the selected position of controller 1.

At the same time, however, the selected digital signal transmitted by the controller 1 to the magnet valve devices for actuating the pneumatic portion of the apparatus, is also transmitted by way of circuits 5 and 6 to converter 73 where said digital signal is converted to an actuating analog signal that is modified by the load detector 78 and then transmitted to dynamic brake 80 which thereby provides a retardation torque according to the magnitude of the actuating signal. As was previously noted, the torque of dynamic brake 80 is converted by converter 81 to an energizing current for energizing solenoid 84 to produce the upwardly acting force on diaphragm 85 and thereby, in conventional manner, cause a second control pressure, according to the magnitude of said force acting on said diaphragm, to be supplied to second control chamber 51 of secondary relay valve 48. Consequently, secondary relay valve 48 effects supply of fluid pressure to brake cylinder pipe 59 (and thus to the brake cylinder) according to the differential of the first and second control pressures supplied to said secondary relay valve.

Figure 3:
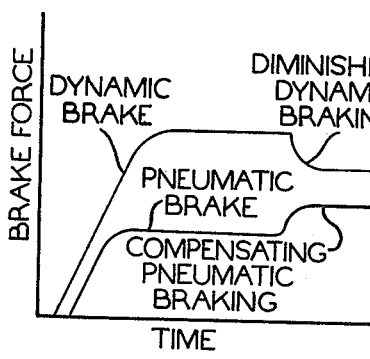
FIGS. 3, 4, and 5 are graphs representing several functions of the brake apparatus shown in FIGS. 1 and 2.

As was previously noted, as the effectiveness of the dynamic brake diminishes, the second control pressure in second control chamber 51 is reduced accordingly, so that the first control pressure in first control chamber 47, in effect, becomes more dominant, and the pressure supplied to brake cylinder pipe 59 and the brake cylinder is accordingly increased by the lapping action of secondary relay valve 48 to compensate for the loss in effectiveness of the dynamic brake. This compensating action is represented graphically in FIG. 3 of the drawings.

Figure 4:
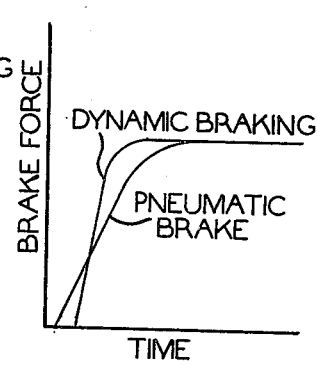

Assuming now that the operator desires to step up the braking action and accordingly operates controller 1 to a higher position, such as position 4. The brake apparatus, both the pneumatic and dynamic portions, react accordingly to increase the braking action. Since, as is known to those skilled in the art, the dynamic brake portion reacts ahead of the pneumatic portion, the change in braking forces, during the initial stage, in those cars equipped with the pneumatic brake system only will lag the change in those cars equipped with the combined electro-penumatic brake system to produce the undesirable push-pull effect above mentioned. This incompatible braking action occurring during the initial stage of braking increase is represented graphically in FIG. 4 of the drawing.

In order to eliminate the undesirable push-pull effect above discussed and in accordance with the invention, the selected signal from controller 1 is not transmitted directly to dynamic brake 80 through converter 73 and load detector 78. Instead, the first control pressure supplied to first control chamber 47 of secondary relay valve device 48, is also transmitted, as shown in FIG. 2, by way of a branch pipe 87 tapped off pipe 72, to a pneumatic-electro converter 88 of any suitable type which converts said first control pressure to an electrical current of corresponding magnitude which is transmitted via a conductor 89 to dynamic brake 80 for actuation thereof.

Figure 5:
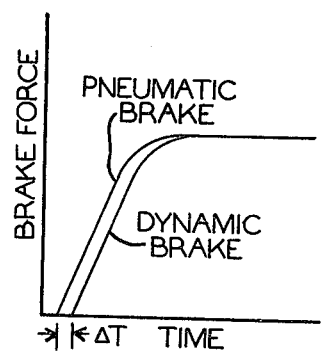
Figures 2, 6, 7:
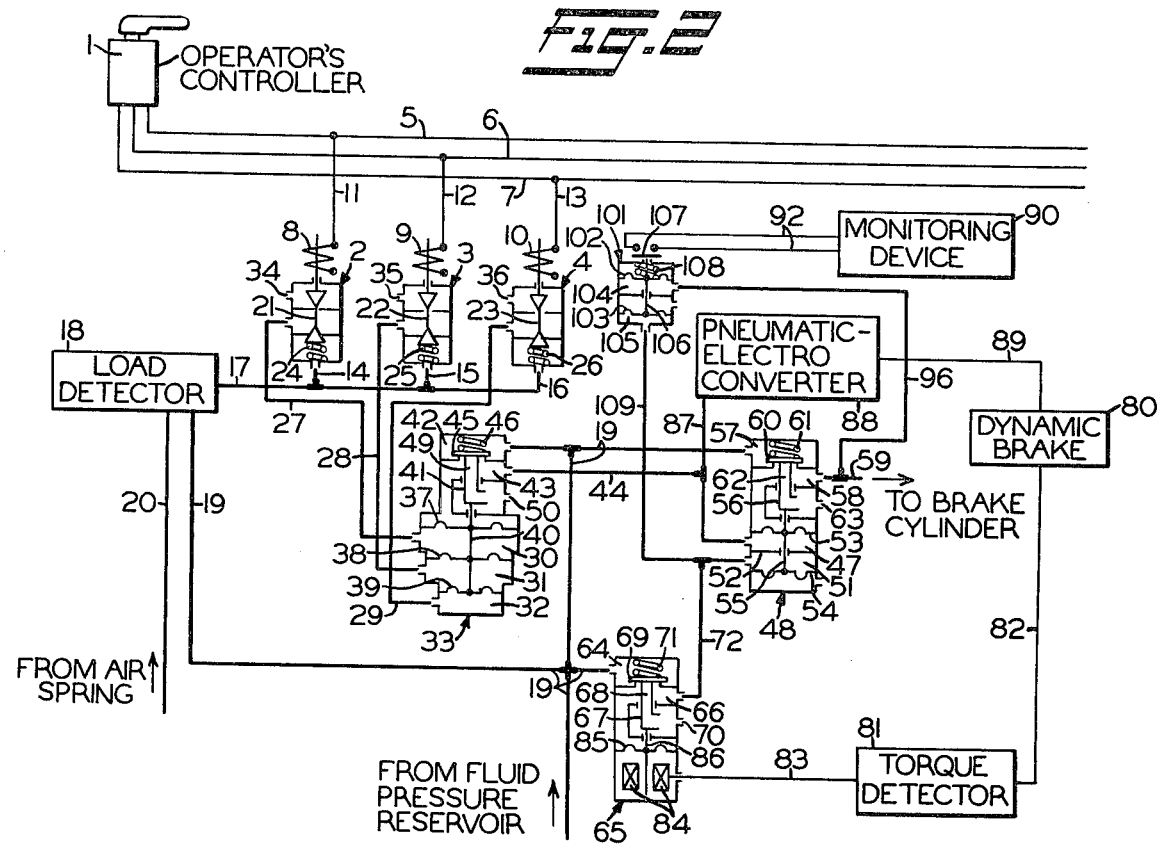
FIG. 2 is a schematic view of an electro-pneumatic brake apparatus embodying the invention.
FIGS. 6 and 7 are tables indicating certain results occurring during operation of the brake apparatus shown in FIG. 2 to selected positions.

Subsequent to actuation of dynamic brake 80, the remaining operation of the apparatus is similar to that described above in connection with the conventional apparatus shown in FIG. 1, except that, with the improvement provided by the invention and as shown in FIG. 2, the effectiveness of dynamic brake 80, when actuated, is delayed an instant in that the actuating signal therefor is diverted via the pneumatic control devices and converted to a pneumatic signal which acts concurrently with the signal actuating the pneumatic brake. This action is represented graphically in FIG. 5 of the drawings, wherein the time interval of delay of the dynamic braking relative to pneumatic braking is represented by $\Delta T$. Although the representation of delay $\Delta T$ is exaggerated on the graph in FIG. 5 for purposes of illustration, it should be understood that the pneumatic and dynamic brakes are applied practically simultaneously.

As previously mentioned, the electro-pneumatic brake systems herein discussed may be provided with a monitoring device for the purpose of apprising the operator that the brake apparatus is functioning, that is, that a brake application has been effected subsequently to initiation thereof by the operator.

A presently known type of monitoring arrangement is shown in FIG. 1 of the drawings, wherein a monitoring device 90 is connected to two independently energizeable electrical circuits 91 and 92. Electrical circuit 91 is connected to the output conductor 82 from dynamic brake 80 and has interposed therein an electric current relay device 93 for transmitting current generated by said dynamic brake at a certain level or higher, depending upon the setting of the relay device, to the monitoring device 90, which thus indicates the existence of a dynamic brake application.

Electrical circuit 92 has a fluid pressure switch device 94 interposed therein, said switch device having a pressure chamber 95 connected by a pipe 96 to pipe 59 leading to the brake cylinder. A diaphragm 97 in switch device 94 is subject on one side to the force of fluid pressure in chamber 95 acting in one direction and on the other side to the force of a spring 98 of preselected compression rating acting in an opposite direction. Diaphragm 97 is connected by a rod 99 to a switch member 100 normally biased by spring 98 to an open position in which circuit 92 is open, said switch member being operable by the force of fluid pressure in chamber 95, when sufficient for overcoming the opposing force of said spring, to a closed position in which circuit 92 is closed, whereby monitoring device 90 indicates the existence of a pneumatic brake application.

Since, as was above noted, the two circuits 91 and 92 function independently of each other to indicate existence of respective dynamic and pneumatic brake applications, it is not possible to determine, for example, whether the existing degree of pneumatic braking is sufficient for supplementing the dynamic braking which, for some reason, may be less than that called for since the monitoring arranged will indicate even the very minimum of dynamic braking corresponding to the setting of current relay 93.

Accordingly, instead of taking a direct reading from dynamic brake 80 for monitoring the existence of a dynamic brake application, monitoring device 90, as shown in FIG. 2, is connected to circuit 92 only, which has interposed therein a fluid pressure operable double diaphragm switch device 101 having two accumulatively arranged diaphragms 102 and 103 adjacent respective pressure chambers 104 and 105 and connected through a common rod 106 to a switch member 107. A spring 108 of preselected compression rating urges the diaphragm assemblage downwardly, as viewed in the drawing, so that switch member 107 occupies an open position in which circuit 92 is deenergized.

Chamber 104 is connected by pipe 96 to brake cylinder pipe 59, while chamber 105 is connected by a pipe 109 tapped off pipe 72 for subjecting said chamber 105 to the second control pressure directed to second control chamber 51 of secondary relay valve device 48. As will be recalled the second control pressure is the pressure converted from the dynamic braking torque and, therefore, represents the level of the prevailing dynamic brake application. Thus when the force of accumulative pressure in chambers 104 and 105 of pressure switch device 101 is sufficient for overcoming the opposing force of spring 108, the diaphragm assemblage is moved upwardly, as viewed in the drawing, to cause switch member 107 and, therefore, circuit 92 to be closed. As a result, monitoring device 90 will indicate the accumulative braking effect of both the pneumatic and dynamic braking.

Having now described the invention what I claim as new and desire to secure by Letters Patent, is:

1. Electro-pneumatic brake apparatus for railway vehicles comprising:
   a. a source of pneumatic pressure;
   b. pneumatic brake means responsive to pneumatic pressure for providing a pneumatic brake force;
   c. dynamic brake means responsive to an electrical impulse for providing a magnetic brake torque;
   d. operator actuated means providing a brake-initiating signal of preselected magnitude;
   e. primary relay valve device connected to said source of pneumatic pressure and to said operator actuated means and operable responsively to said brake-initiating signal to produce a first control pressure;
   f. a pneumatic-electro converter device connected to said primary relay valve device and to said dynamic brake means for converting said first control pressure to an electrical impulse transmitted to said dynamic portion for producing said magnetic brake torque;
   g. electro-pneumatic converter means connected to said dynamic brake means for receiving and converting said magnetic brake torque to a second control pressure; and
   h. a secondary relay valve device connected to said source of pneumatic pressure, to said primary relay valve device, and to said electro-pneumatic converter means, and operable responsively to said first and second control pressures for effecting supply of operating pneumatic pressure from said source to said pneumatic brake means at a degree according the differential between said first and second control pressures for producing a corresponding brake force.

2. Electro-pneumatic brake apparatus, as set forth in claim 1, further characterized by monitoring means connected to said secondary relay valve means and to said pneumatic brake means and operable responsively to said second control pressure and to said operating pneumatic pressure, accumulatively, for indicating the combined dynamic and pneumatic brake forces.

3. Electro-pneumatic brake apparatus, as set forth in claim 2, wherein said monitoring means comprises:
   a. a monitoring device for indicating, when electrically actuated, the degree of prevailing brake application; and
   b. an electrical circuit including a pressure operable switch device for actuating said monitoring device when said circuit is closed said switch device having formed therein a pair of pressure chambers one of which is subjected to said second control pressure and the other being subjected to said operating pneumatic pressure supplied to said pneumatic brake means, said switch device also comprising:
      i. a switch member interposed in said circuit,
      ii. a pair of diaphragms disposed adjacent said pair of pressure chambers, respectively, and connected to each other and to said switch member by a common piston rod for uniform movement together,
      iii. said diaphragms and said switch member being normally biased to one position in which said electrical circuit is open and being operable responsively to the pressures prevailing in said pressure chambers, in excess of a certain accumulative pressure, to a different position in which said circuit is closed.

4. Electro-pneumatic brake apparatus, as set forth in claim 2, wherein said operator actuated means comprises a binary code controller.

5. Electro-pneumatic brake apparatus, as set forth in claim 1, wherein said operator actuated means comprises:
   a. a coded operator's controller selectively operable to a plurality of positions for producing an electrical signal at a degree according to the coded position selected; and
   b. a plurality of electro-magnet supply valve devices each connected to said source of pneumatic pressure and in parallel relation to said primary relay valve device, said electro-magnet valve devices being operable, in combination, responsively to said brake-initiating signal for effecting supply of actuating pressure to said primary relay valve device at a degree determined by said coded signal for producing said first control pressure accordingly.

6. Electro-pneumatic brake apparatus, as set forth in claim 5, wherein said primary relay valve device comprises:
   a. a plurality of diaphragms subjectable to pneumatic pressure in respective pressure chambers formed adjacent thereto and connected to said plurality of electro-magnet supply valve devices, respectively, said diaphragms being connected to each other in axially spaced-apart relation by a common piston rod for uniform movement together and having respective effective pressure areas according to a predetermined ration, and
   b. self-lapping valve means operable by said diaphragms for providing said first control pressure according to the net effective pressure area pressurized by the combination of electro-magnet supply valves energized.

7. Electro-pneumatic brake apparatus, as set forth in claim 5, wherein said secondary relay valve device comprises:
   a. a pair of diaphragms subjectable to said first and second control pressure, in opposing relation, prevailing in first and second control chambers formed adjacent thereto, respectively, said diaphragms being connected to each other in axially spaced-apart relation by a common piston rod for uniform movement together and being of similar effective pressure areas; and
   b. self-lapping valve means operable by said diaphragms for effecting said supply of operating pneumatic pressure to said pneumatic brake means.

8. Electro-pneumatic brake apparatus, as set forth in claim 5, wherein said electro-pneumatic converter means comprises:
   a. a torque detector device connected to said dynamic brake means and operable responsively to said magnetic brake torque for producing a corresponding electrical current; and
   b. an electro-pneumatic converter relay valve device connected to said source of pneumatic pressure and to said second control chamber of said secondary relay valve device, and electro-penumatic converter relay valve device comprising:
      i. a piston,
      ii. self-lapping valve means operable by said piston for effecting supply of said second control pressure from said source to said second control chamber, and
      iii. a solenoid operable responsively to said electrical current for effecting operation of said piston and said self-lapping valve means to effect said supply of said second control pressure at a degree corresponding to the degree of the electrical current.

* * * * *